(12) United States Patent
Gorohata et al.

(10) Patent No.: US 6,885,123 B2
(45) Date of Patent: Apr. 26, 2005

(54) STATOR COIL MADE OF JOINED CONDUCTOR SEGMENTS FOR ROTARY ELECTRIC MACHINERY AND METHOD FOR MANUFACTURING THE SAME

(75) Inventors: Tetsuya Gorohata, Anjo (JP); Youichi Kamakura, Anjo (JP); Hitoshi Hirano, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/602,049

(22) Filed: Jun. 24, 2003

(65) Prior Publication Data
US 2004/0061401 A1 Apr. 1, 2004

(30) Foreign Application Priority Data
Jun. 25, 2002 (JP) ........................................ 2002-184879

(51) Int. Cl.[7] .............................. H02K 3/04; H02K 3/12; H02K 15/04
(52) U.S. Cl. ....................................................... 310/201
(58) Field of Search ................................ 310/179, 180, 310/201, 208; 29/596, 598, 605

(56) References Cited

U.S. PATENT DOCUMENTS

| | | | |
|---|---|---|---|
| 2,361,842 A | 10/1944 | Heintz et al. | |
| 2,393,397 A | 1/1946 | Mullarkey | |
| 2,476,743 A | 7/1949 | Leece | |
| 4,739,643 A | 4/1988 | Kuriyama et al. | |
| 6,177,747 B1 | 1/2001 | Maeda et al. | |
| 6,249,956 B1 | 6/2001 | Maeda et al. | |
| 6,403,921 B1 | 6/2002 | Maeda et al. | |
| 6,498,413 B2 * | 12/2002 | Imori et al. | 310/180 |
| 6,498,414 B2 * | 12/2002 | Asao | 310/184 |
| 6,525,443 B2 * | 2/2003 | Asao | 310/201 |
| 6,694,598 B2 * | 2/2004 | Takahashi et al. | 29/596 |

FOREIGN PATENT DOCUMENTS

| | | |
|---|---|---|
| EP | 1 041 702 A2 | 10/2000 |
| JP | A-63-274335 | 11/1988 |
| JP | A 6-153463 | 5/1994 |
| JP | A 6-284651 | 10/1994 |
| JP | B2 6-87644 | 11/1994 |
| JP | A 2000-139049 | 5/2000 |
| JP | B1 3104700 | 9/2000 |
| JP | B2 3118837 | 10/2000 |
| JP | B2 3196738 | 6/2001 |

* cited by examiner

*Primary Examiner*—Tran Nguyen
(74) *Attorney, Agent, or Firm*—Oliff & Berridge, PLC

(57) ABSTRACT

A stator coil has a plurality of segments serially connected with each other to construct one turn in a phase coil. Each of the segments has a pair of slot conductor portions, a head portion which is projected toward an end of the stator core, and a pair of projected end portions which project from another end of the stator core. The head portion has head tip portion, a pair of head oblique portions, and a pair of projected end portions, each of which is stretched obliquely along the circumferential and axial directions of the stator core. A pair of end tip portions, formed at a tip of the corresponding end oblique portion, is joined with an end tip of the other end tip portion. The head oblique portions or the end oblique portions are made circular-arch-shaped around an axis of said stator core.

6 Claims, 13 Drawing Sheets

STATOR COIL MADE OF JOINED CONDUCTOR SEGMENTS FOR ROTARY ELECTRIC MACHINERY AND METHOD FOR MANUFACTURING THE SAME

BACKGROUND OF THE INVENTION

1. Field of the Invention

The present invention relates to a stator coil constructed by joined conductor segments for rotary electric machines and a method for manufacturing the same.

2. Description of the Related Art

There have been disclosed joined conductor segment stator coils, wherein a plurality of conductor segments inserted into slots of a stator core are sequentially connected one by one. For example, a method for manufacturing the joined conductor coil (joined conductor segment stator coil) by utilizing nearly U-shaped conductor segment in JP No. 3118837.

In JP No. 3118837, legs of a pair of the nearly U-shaped conductor segments are inserted into an entrance of, and are projected from the opposite exits of, a pair of slots distant from each other by a magnet pole pitch of a rotor. Then, the projected legs are bent toward the circumferential direction of the rotor and are sequentially joined together.

Therefore, the conductor segment comprises: a nearly U-shaped (nearly V-shaped seen along the circumferential direction after bending process as explained below) head portion; a pair of slot conductor portions which are inserted into a pair of slots, and are staying in the pair of slots; and a pair of projected end portions projected from the other end of the pair of slots. Further, the tips of the projected end portions in the pair are joined with each other. Here, in the present specification, the projected end portion together with the slot conductor portion is sometimes denoted as a leg of segment. The head portion of segment is a head side coil end of the stator coil, while the projected end portion is an end side coil end.

Further, there are disclosed also in JP No. 3118837 co-axially disposed two rings for holding four legs of a pair of the small and large segments. Here, the large segment surrounds the small segment. The rings are relatively rotated in order to form a oblique end portion (a pair of legs oblique toward the circumferential direction of the rotor).

Further, it is disclosed in JP No. 310470 that a projected end portion is welded with another project end portion adjacent along the radial direction and further a binding member is held between the two projected end portions adjacent with each other in the circumferential direction in order to stabilize their positions.

Next, an exemplary method for manufacturing the joined conductor coil as disclosed in the above-mentioned prior art documents is explained.

First, a required number of pine needle segments are prepared and are bent to have the U-shaped heads. Then, the segment legs are bent along the circumferential direction by a magneto pole pitch. The segment sets are arranged along the circumreferential direction in order to simultaneously insert them into all the slots of the core. The two rings (co-axially disposed) with a plurality of holes as shown in FIG. 3 in JP No. 3118837 may be employed. Concretely, segment legs are inserted into the outer and inner rings at the same circumferential direction and then the inner and outer rings are relatively rotated in order to deform the head portion in such a manner that the head portion is made open like a V-shape.

Further, a process step follows for inserting the V-shaped deformed segments which are arranged along the circumferential direction into slots of the stator core. Concretely, holding the head portions, the segment sets are pulled out from the rings and are inserted into the slots.

Further, a process step follows for bending, preferably by a half pitch of the magneto pole, the projected end portion along the circumferential direction. The two rings (co-axially disposed) with a plurality of holes as shown in FIGS. 4 and 5 in JP No. 3196738 may be employed for the above-mentioned bending step. The projected end portion is inserted into the holes, then the inner and outer rings are relatively rotated by a half pitch of the magnet pole and then the projected end portion is bent by the half pitch along the circumferential direction. The radius of curature at the bending point can preferably be made larger, if the rings are pressed along the axial direction toward the projected end portion. Further, a process step follows for welding the projected end portions each other in a prescribed order.

Thus, phase coils, e.g., three phase armature coils are endlessly formed. Terminals for each phase are formed by cutting the head portion of the segment. If the terminal is made long beforehand, the long terminal can be utilized for a crossover for a neutral point. It is noticed that the terminal is provided at the head portion side, because the long terminal wire is obstructive against the welding of the projected end portions.

The joined segment stator coil as manufactured by the above-explained processes has been employed for a stator coil of alternating current dynamo for automotive vehicles.

However, the conventional joined segment stator coil has disadvantages as stated below.

A pair of the projected end portions projected from the stator core are positioned at the same circumferential position and at different radial positions. Then, by the relative rotation of the rings, the projected end portions are relatively rotated in a reverse direction with each other and are bent along the circumferential direction.

The end portion is bent down linearly and obliquely (both along the circumferential and radial directions) in such a manner that the tip of end portion after bending be connected by the shortest distance with a part of a slot conductor portion which is not bent.

This is similar, when the head portion is bent down.

Therefore, the conventional manufacturing process has a disadvantage that the oblique head portions and oblique end portions, particularly those at innermost radial side go beyond the inner circumferential surface of the stator core, thereby making it difficult to insert the rotor into the inside of the stator core and causing an interference of oblique head and end portions with a cooling fan provided on an end surface of the rotor.

As already mentioned, the oblique head and end portions extend not over the circumferential surface, but over a plane. This means that the square shaped conductor segment is bent toward the square cross section at a border portion of the oblique head portion and a tip of head portion, at a border of the oblique end portion and a tip of end portion, at a border of the oblique head portion and slot conductor portion and at a border of the oblique end portion and slot conductor portion. Accordingly, the conventional manufacturing process has another disadvantage that a great stress is generated in the insulating coating at the border portion, thereby degrading an insulation of the segment. This may be a possible disadvantage, when the conventional joined segment stator coil is to be applied for a high voltage rotary machinery such as a vehicle motor.

SUMMARY OF THE INVENTION

An object of the present invention is to reduce, in a stator coil made of conductor segments which are inserted into slots of a stator core and are joined sequentially, a stress at an insulating coating of a conductor segment.

Another object is to provide a multiply turned stator coil suitable for a high voltage and large current driving motor.

Still another object is to provide a stator coil and its manufacturing method whereby an interference between a stator coil preparing process and rotor inserting process can be avoided, i.e., the coil preparation does not disturb the rotor insertion.

The present invention has five Features as stated below.

In Feature 1, the stator coil comprises:
- a plurality of segments each of which is received in stator core slots having an even number of receiving positions in a radial direction, thereby constructing one turn in a phase coil in M (integer greater than or equal to 3) phase coils;
- said segment comprising: a pair of slot conductor portions each of which is received in receiving positions different with each other in a pair of slots distant by a prescribed pitch; a head portion which is projected toward an end of said stator core; and a pair of projected end portions each of which is projected from another end of said stator core;
- said head portion comprising: a U-shaped head tip portion; and a pair of head oblique portions each of which is stretched obliquely along the radial and axial directions of said stator core;
- said projected end portion comprising: a pair of end oblique portions each of which stretches obliquely along the radial and axial directions of said stator core; and a pair of end tip portions each of which is formed at a tip of said end oblique portion and is joined with an end tip of different end tip portion;
- characterized in that said head oblique portions and end oblique portions are made circular-arch-shaped around an axis of said stator core.

According to Feature 1, the head portions and end projected end portions do not enter, crossing the inner circumference of the stator core, into the inner space for a rotor, thereby easily assembling the rotor into the motor and fixing a larger-sized cooling fan.

Further, both ends of the head oblique portion and both ends of the end oblique portion are bent along the circumferential direction along which the segment side extending along the radial direction is bent as a bending line, thereby greatly reducing the stress on the insulating coating on the segment. This is advantageous for a higher voltage motor.

In Feature 2, the stator coil as described in Feature 1 is further characterized in that:
- each of said slots receives at different receiving positions a plurality of segment sets wherein a larger segment surrounds a smaller segment which is received at adjacent receiving positions;
- a group of said segment sets received at the same radial positions and disposed along the circumferential direction forms a group of partial phase coils to which the same phase voltage is applied; and
- said partial phase coils received at said adjacent receiving positions in a slot are sequentially connected in series, thereby forming said phase coil.

Conventional rotary machinery employing a stator coil made of conductor segments sequentially joined with each other are used for an AC dynamo for automotive vehicles. Further, the rotary machinery as a driving motor is being expected to be highly powered. Here, the highly-powered driving motor must be supplied with a battery voltage of several hundred voltages far more higher than the conventional motor, due to an easy wiring in its manufacturing process and reduction of resistance loss in the stator coil. However, the rotation speed of the highly-powered driving motor is almost the same as that of the conventional motor. Therefore, the highly-powered driving motor must be provided with a greater number of turns in the stator coil.

Although the number of turns may be increased by, e.g., 5 segments 33a to 33e as shown in FIG. 13, the required number of segments are disadvantageously increased and the head of the outermost segment 33e becomes longer, thereby increasing the wiring resistance.

Further, the width W of the head H as shown in FIG. 13 becomes considerably greater than a total width of the leg portion, thereby increasing an axial length of the motor and its weight.

Further, the gap "d" must be assured between the legs as well as between the heads in order to prevent them from rubbing with each other during the enlarging process. Thus, the conventional stator coil as shown in FIG. 16 has a disadvantage that the slot is not efficiently occupied by the conductor segments.

Furthermore, the conventional stator coil has another disadvantage that the heat radiation of the inner segment 33a becomes worse.

In order to overcome those disadvantages, the phase coil of the present invention is constructed in such a manner that: a plurality of segment sets, e.g., 4 segment sets as shown in FIG. 3, is received at adjacent radial positions in a slot; the prescribed segment sets along the circumferential direction are connected in series with each other; thereby forming partial phase coils; and a partial phase coil is connected in series with the adjacent partial coil sequentially, thereby completing the phase coil in M phase coils.

Thus, According to Feature 2, the partial phase coils are easily connected with each other in the radial direction by using binder segments. Thus, segment sets (partial phase coil) are made uniform enough to prevent them from causing a local over-heating due to a local concentration of an electric current distribution due to a fluctuation in their wiring length.

In Feature 3, the stator coil described in Feature 2 is further characterized in that:
- a group of slots along the circumferential direction receiving said segments to which the same phase voltage is applied is made a same phase slot group;
- a plurality of series phase coil circuit made of said partial phase coils sequentially connected in series are formed in different slots in said same phase slot group; and
- said series phase coil circuits are connected in parallel, thereby forming said phase coil.

Conventional rotary machinery employing the conductor segment stator coil is used for an AC dynamo for automotive vehicle. Further, the rotary machinery as a driving motor is expected to be highly powered. Therefore, a large electric current is required to obtain a highly-powered driving motor. There is a limitation in increasing a cross section of the conductor segment in order to allow the large electric current to flow. Therefore, the partial phase coils may be connected in parallel in order to increase the total cross section of the phase coil. However, the parallel connection as mentioned above was not easy in the sequential connection of the segments, because extra wires are required in order to pass over the segments with each other.

Therefore, in Feature 4, a plurality of series phase circuit are received in different slots in a group of slots of the same phase.

According to Feature 3, the wiring resistances of the series phase circuits are made uniform, thereby making uniform the currents in the partial phase coils. Further, even when the resistances depend upon the partial phase coils which are disposed at different radial positions, resistance values of the above-mentioned series phase coils are not changed. That is an advantage of great importance.

Thus, according to Feature 3, the number of turns of the stator coil can be increased without using any segment sets including a greater number of conductor segments and without adding any passing-over wires at the coil end. Thus, the stator coil as described in Feature 3 is suitable for a high voltage and large electric current driving motor for automotive vehicles.

In Feature 4, the method for manufacturing a stator coil comprises the steps of:

preparing a plurality of segments each of which comprises a U-shaped head and a pair of parallel legs extending straight from said head;

preparing a plurality of relatively rotating rings disposed co-axially around an axis of said stator core;

holding along the axial direction end portions of said segments projected by a prescribed axial length from said slots;

bending by relatively rotating said rings said end portions obliquely against said axis; and characterized in that said head portions are bent in order to be circular-arch-shapes around said axis of said stator core by using a cylindrical guide member of which outer circumferential surface touches during relatively rotating said rings said segments at the radial innermost circumference of said slots.

According to Feature 4, the head portion is obliquely bent to form a circular-arch-shape, thereby obtaining advantages of Feature 1.

In Feature 5, the method as described in Feature 4 is further comprises the steps of:

inserting said pair of parallel legs into a pair of slots distant by a prescribed pitch in a stator core; and joining sequentially said legs adjacent in the radial direction, thereby completing said stator coil;

characterized in that said end portions projected from said slots are bent in order to be a circular-arch-shape around said axis of said stator core by using another cylindrical guide member of which outer circumferential surface touches during relatively rotating said rings said segments at the radial innermost circumference of said slots.

According to Feature 5, the projected end portions are obliquely bent to form a circular-arch-shape, thereby obtaining advantages of Feature 1.

PREFERRED EMBODIMENT OF THE INVENTION

Figure 1:
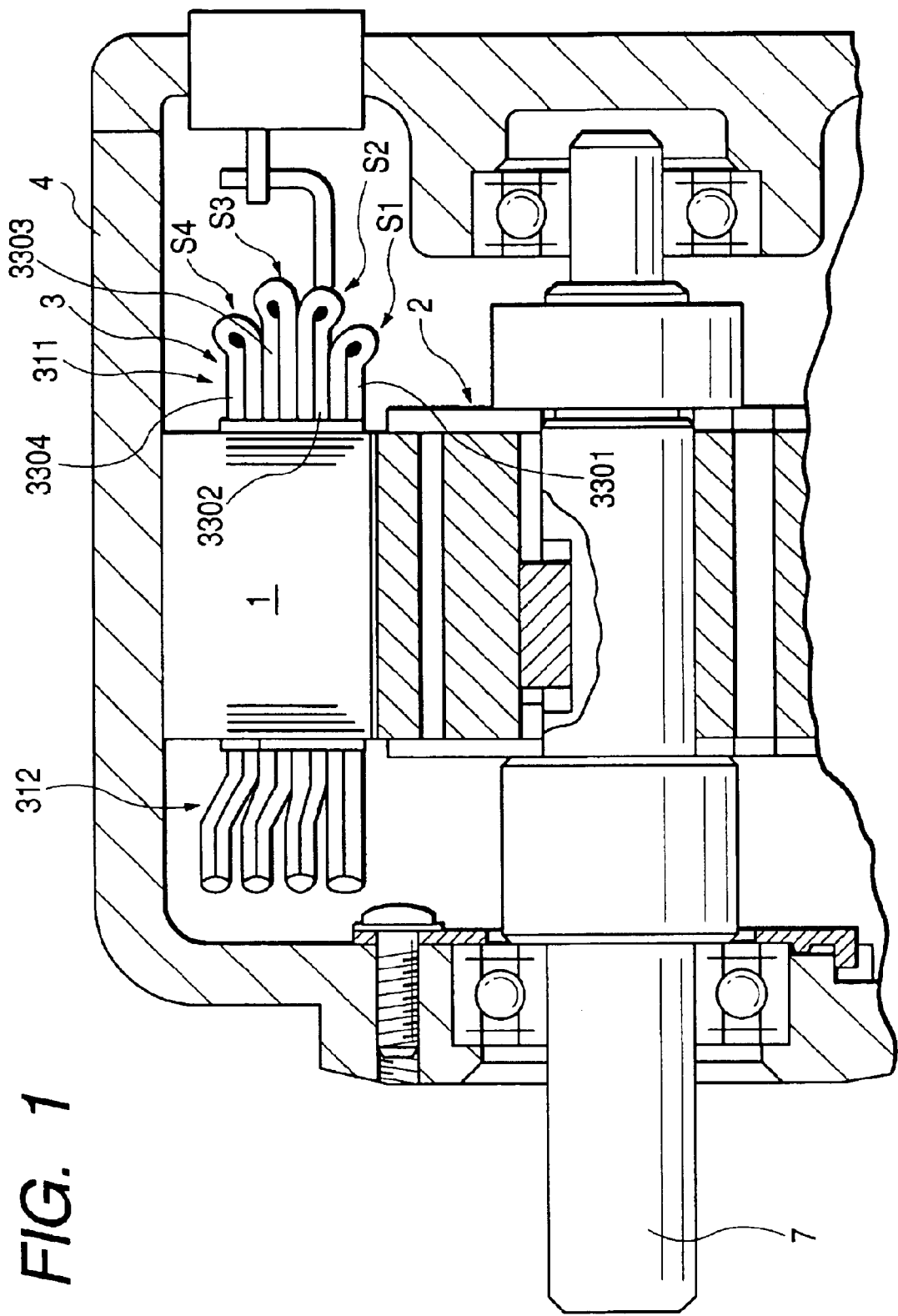
FIG. 1 is a vertical cross sectional view of a motor employing the stator coil made of the joined conductor segments of the present invention for driving a automotive vehicle.
Figure 2:
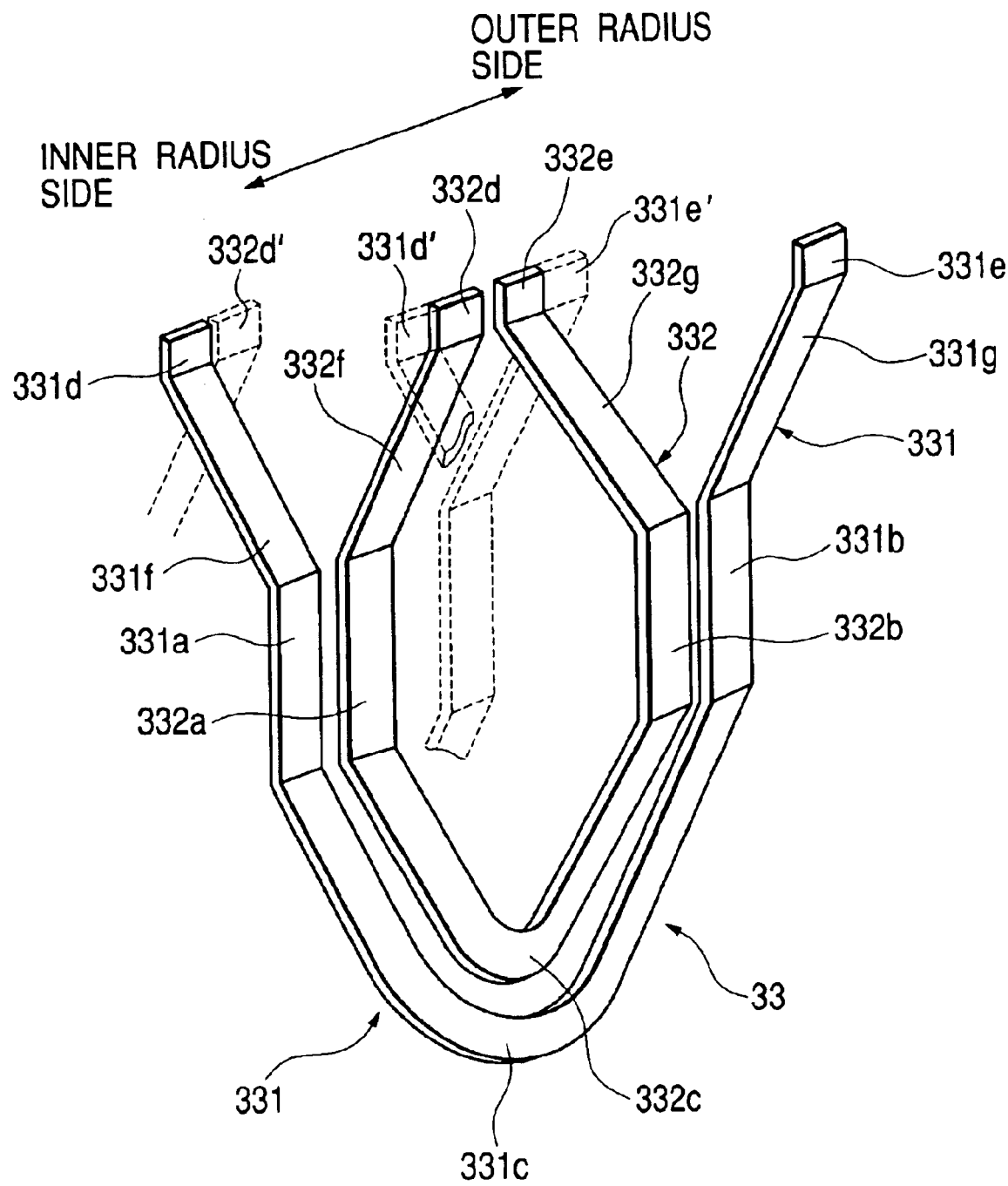
FIG. 2 is a schematic perspective view of a set of the conductor segments as shown in FIG. 1.
Figure 3:
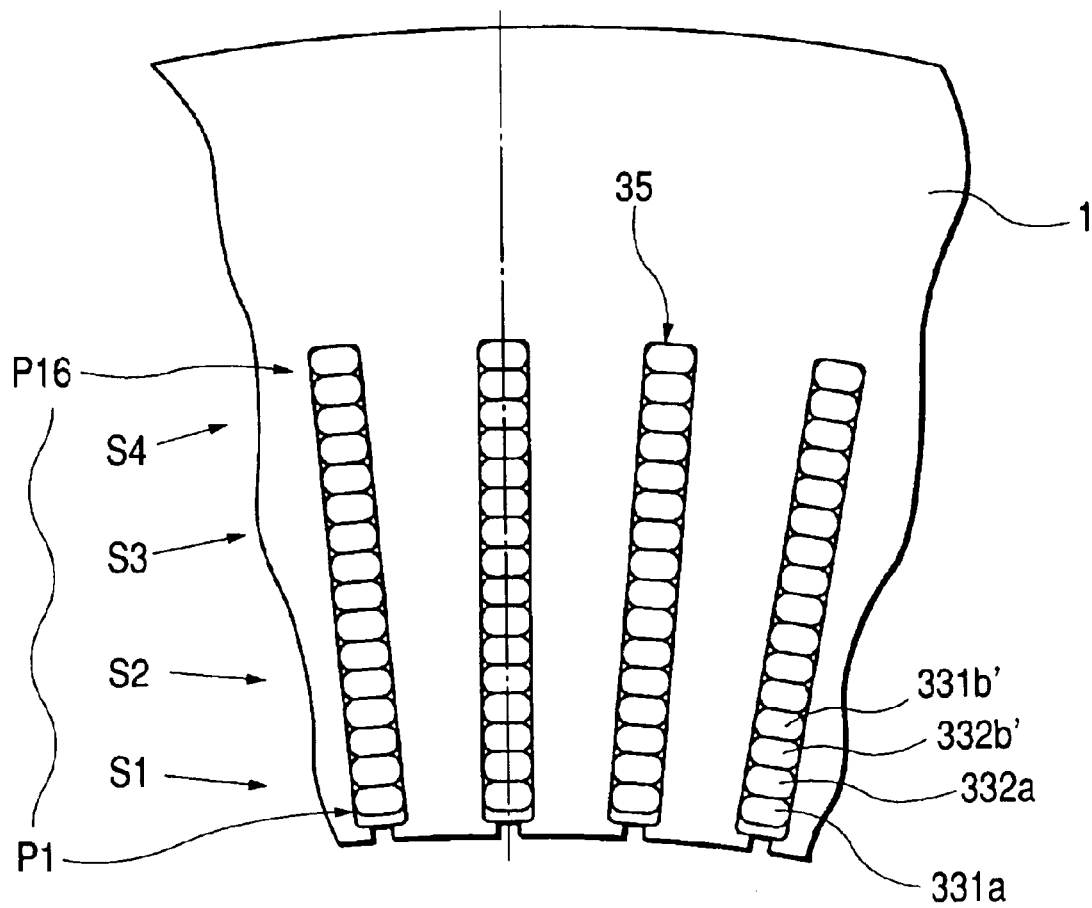
FIG. 3 is a partial cross sectional view of the stator core as shown in FIG. 1.

A preferred embodiment of the present invention is explained, referring to the drawings. FIG. 1 is a cross sectional view along the axial direction of the rotary machinery for a motor employing the stator coil of the present invention for driving an automotive vehicle, wherein coil end portion of the stator coil is schematically illustrated. FIG. 2 is a perspective view of a conductor segment set. FIG. 3 is a partial cross sectional view of segments received in the slots of the stator core.

Driving Motor

As shown in FIG. 1, the driving motor comprises a stator core 1, a rotor 2, a stator coil 3, a hausing 4 and a rotating axis 7. The stator core 1 is fixed at an inner wall of the hausing 4, while the stator coil 3 is wound through the slots of the stator core 1. The rotor 2 is an IPM rotor fixed with the rotating axis 7 rotatably supported by the hausing 4, and is disposed inside the stator core 1. The stator coil 3 is a three phase armature winding coil which is fed by a three phase inverter fed by an external battery of about, e.g., 300 V.

The driving motor is a permanent magnet three phase brush-less DC motor (synchronous motor) for generating a driving force for, e.g., a secondary battery car, fuel cell car, or hybrid car. Its rotor structure may be modified in various publicly known forms of which explanations are omitted.

Stator Coil

As shown in FIG. 2, the segment set 33 of the stator coil 3 is inserted from one side of the stator core 1 through the slots of the stator core, is then projected by a prescribed length from the other side of the stator core 1. Further, the projected end portions of the segment set 33 are bent by an electrical angle of about π/2 along the circumferential direction of the stator core 1. Further, tips of the projected end portions are welded in a prescribed combination. Here, each segment of the segment set 33 is a V-shaped long plate as shown in FIG. 2 coated by a resin except for a pair of leg tips (welding portions).

The segment set 33 comprises a large segment 331 and small segment 332 each of which comprises: a V-shaped head portion; a pair of slot conductor portions linearly extended from both sides of the head portion and received in the slots; and a pair of the projected end portion extended from the slot conductor portions. In other words, the stator coil has three part: a first coil end at one side of the stator core 1; a second coil end at the other side of the stator core 1; and the slot conductor portion received in the slots.

The head coil end 311 as shown in FIG. 1 is above-mentioned first coil end, while projected coil end 312 as shown in FIG. 1 is above-mentioned second coil end.

As shown in FIG. 1, four segments are inserted along the radial direction of the stator core 1. The head portion 3301 is of the innermost segment set S1; the head portion 3302 is of the second innermost segment set S2; the head portion 3303 is of the third innermost (second outermost) segment set S3; and the head portion 3304 is of the outermost segment set S4. The head portions 3301,3302,3303 and 3304 sequentially arranged along the radial direction construct the head coil end 311. Similarly, there are illustrated the projected coil end 312 in FIG. 1.

Segment Set

As already mentioned, the segment set 33 as shown in FIG. 2 comprises the large segment 331 and small segment 332.

The large segment 331 comprises the slot conductor portions 331*a* and 331*b*, the head portion 331*c* and the projected end portions 331*f* and 331*g*. The tips 331*d* and 331*e* of the projected end portions 331*f* and 331*g*, respectively, are joining (welding) portions. The slot conductor 331*a* is the innermost slot conductor portion, while the slot conductor 331*b* is the outermost slot conductor portion.

Similarly, the small segment 332 comprises the slot conductor portions 332*a* and 332*b*, the head portion 332*c* and the projected end portions 332*f* and 332*g*. The tips 332*d* and 332*e* of the projected end portions 332*f* and 332*g*, respectively, are joining portions. The slot conductor 332*a* is the second innermost slot conductor portion, while the slot conductor 332*b* is the second outermost slot conductor portion.

An element with dashed ("'") reference numeral is welded with a similar element without dash illustrated by dotted lines at the position adjacent along the radial direction. Thus, the joining portion 331*d* is welded with joining portion 332*d*'. Further, the joining portion 332*d* is welded with joining portion 331*d*'. Further, the joining portion 332*e* is welded with the joining portion 331*e*'.

When the right legs of the slot conductor portions 331*a* and 332*a* are received in a slot, the left legs of the slot conductor portions 331*b* and 332*b* are received in another slot distant by a prescribed odd number pitch of magnet pole (e.g., one magnet pole pitch (electrical angle □)). Before and after the insertion, the small head portion 332*c* is kept surrounded by the large head portion 331*c*.

Arrangement of Segment Sets in Slots

As shown in FIG. 3, a plurality of, e.g., 16 positions P1 to P16 for receiving the conductor segments are prepared. Each position receives a slot conductor portion. four segment sets S1 to S4 are sequentially received along the radial direction in such a manner that S1 is received in P1 to P4, S2 is received in P5 to P8, S3 is received in P9 to 12 and S4 is received in P13 to P16. Here, each of S1 to S4 is made of a plurality (for example, two, as shown in FIG. 2) of segments, respectively.

Figure 4:
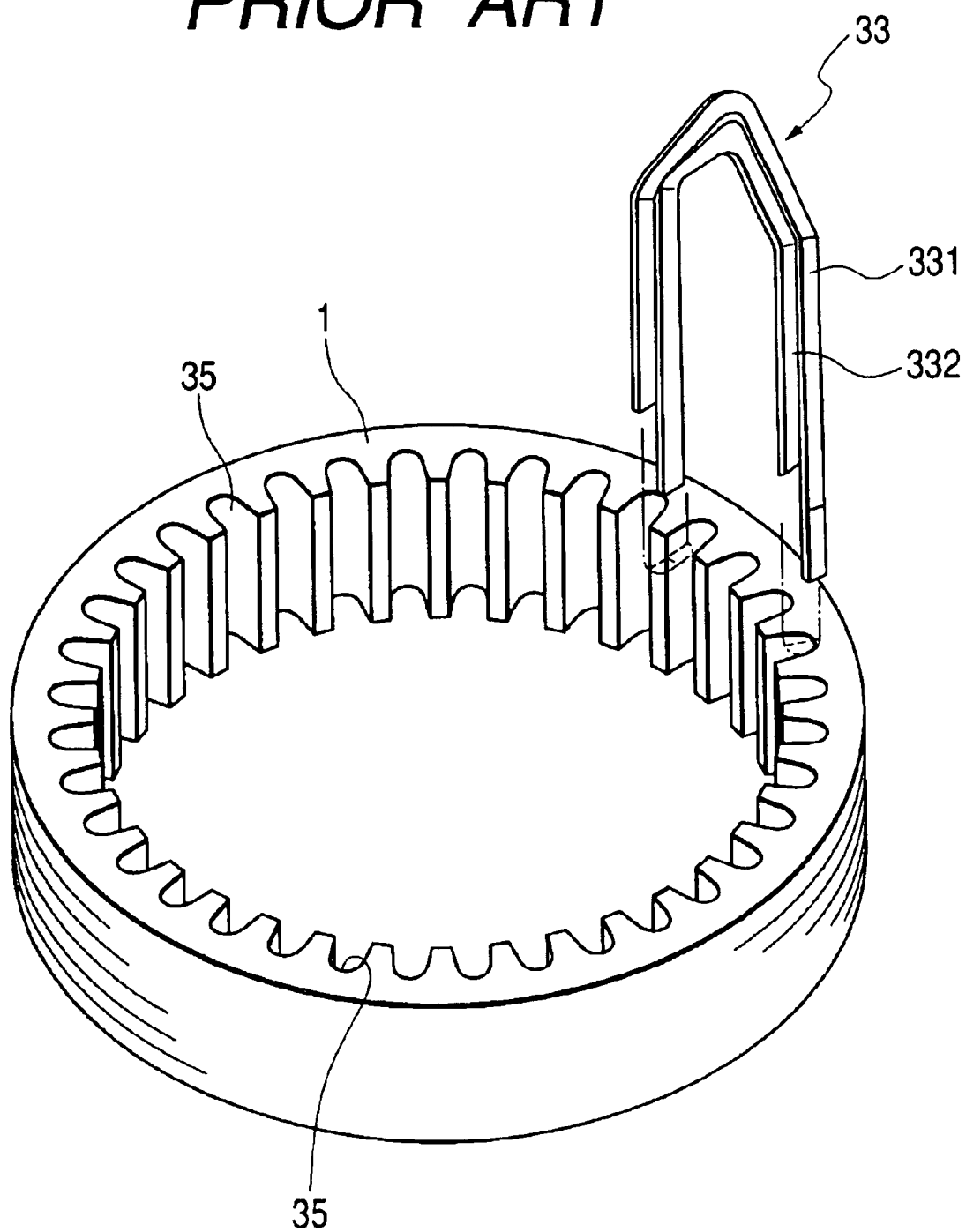
FIG. 4 schematically shows one of the segment pair before being inserted into the slots of the stator core.

As for the innermost segment set S1, the innermost slot conductor portion 331*a* is disposed at the innermost position of the slot 35 of the stator core 32. Then, the second innermost slot conductor portion 332*a*, the second outermost slot conductor portion 332*b*' and the outermost slot conductor 331*b*' are sequentially disposed in this order toward the outer radial direction. The other segment sets S2 through S4 have similar arrangements and structures. Each segment set 33 constructed by the large segment 331 and small segment 332 is inserted into two slots distant by a prescribed pitch of the magnet pole, as shown in FIG. 4.

Structure of Three Phase Stator Coil

Figure 9:
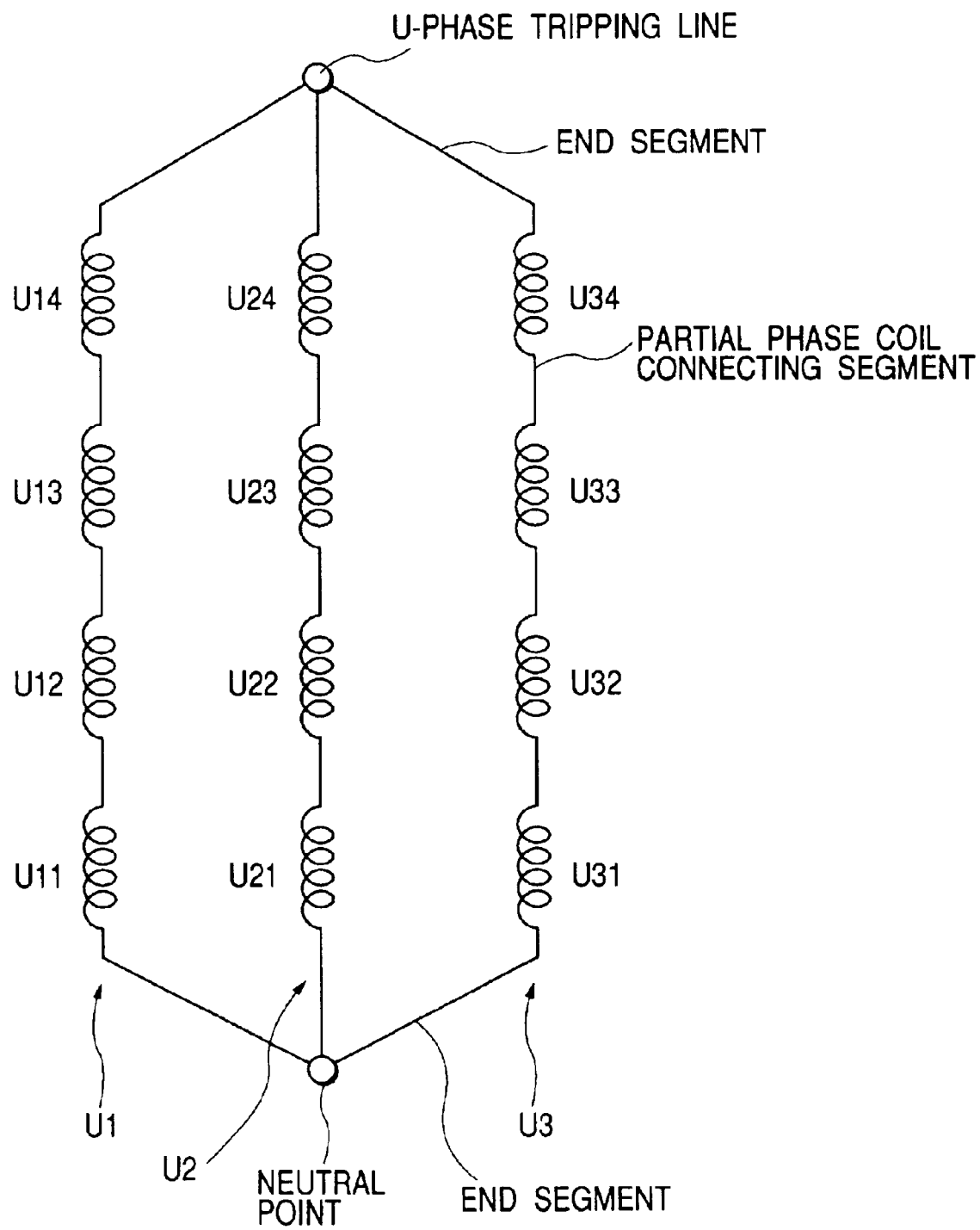
FIG. 9 is wiring diagram of the U phase of the stator coil.

FIG. 9 is a circuit diagram of the three phase stator coil wherein S1 to S4 are arranged along the radial direction.

For example, there are 108 slots in a stator (9 slots every magnet pole pitch (3 slots each of the three phases, 12 poles). The adjacent three slots are in phase wherein the same phase voltage is applied. There are formed in the slot along the radial direction 16 positions P1 to P16 for receiving the slot conductor portions.

The segment sets S1 received at P1 to P4 counted from the innermost side along the radial direction are connected with each other by such a method as the wave winding in order to form three first partial phase coils. The coils U11, U21, U31 as shown in FIG. 9 are the first partial coils. The partial coils U11, U21 and U31 are received at slots adjacent with each other.

The segment sets S2 received at P5 to P8 counted from the innermost side along the radial direction are connected with each other by such a method as the wave winding in order to form three first partial phase coils. The coils U12, U22 and U32 as shown in FIG. 9 are the first partial coils. The partial coils U12, U22 and U32 are received at slots adjacent with each other.

The segment sets S3 received at P9 to P12 counted from the innermost side along the radial direction are connected with each other by such a method as the wave winding in order to form three first partial phase coils. The coils U13, U23 and U33 as shown in FIG. 9 are the first partial coils. The partial coils U13, U23 and U33 are received at slots adjacent with each other.

The segment sets S4 received at P13 to P16 counted from the innermost side along the radial direction are connected with each other by such a method as the wave winding in order to form three first partial phase coils. The coils U14, U24 and U34 as shown in FIG. 9 are the first partial coils. The partial coils U14, U24 and U34 are received at slots adjacent with each other.

The partial phase coils U11, U12, U13 and U14 are received in the first slot (counted from one side along the circumferential direction) among the three adjacent slots. Similarly, the partial phase coils U21, U22, U23 and U24 are received in the central slot (counted from one side along the circumferential direction) among the three adjacent slots. Similarly, the partial phase coils U31, U32, U33 and U34 are received in the last slot (counted from one side along the circumferential direction) among the three adjacent slots.

The partial coils U11, U12, U13 and U14 adjacent with each other along the radial direction are sequentially connected in series with each other, thereby forming a series partial coil U1. Similarly, the partial coils U11, U12, U13 and U14 adjacent with each other are sequentially connected with each other, thereby forming a series partial coil U2. Similarly, the partial coils U31, U32, U33 and U34 adjacent with each other are sequentially connected with each other, thereby forming a series partial coil U3. The coil Uij is connected with Uik (k=j+1) by inserting a V-shaped segment.

For example, one of the segments, preferably a large segment of U12 is pulled out, thereby forming a vacant pair of the conductor receiving positions, while one of the segments, preferably a large segment of U13 is pulled out, thereby forming another vacant pair of the conductor receiving positions. Then, two of the four vacant positions are utilized to connect U12 with U13 in such a manner that the above-mentioned V-shaped segment is inserted into the above-mentioned two of the four vacant positions.

Further, one of the segments, preferably a large segment of U1 is pulled out, thereby forming a vacant pair of the conductor receiving positions. Then, one of the two vacant positions of U11 and the rest of the vacant positions of U12 are utilized to connect U11 with U12.

Further, a V-shaped segment for a neutral point or pull-out terminal is inserted into the rest of the vacant positions of U11, while another V-shaped segment for a pull-out terminal or neutral point is inserted into the rest of the vacant positions of U14.

Thus, a phase coil (U-phase coil) is formed by connecting both ends with each other of U1, U2 and U3. V-phase coil and W-phase coil are formed similarly.

Next, manufacturing processes for manufacturing the stator coil of the present invention are explained.

Head Portion Bending

First, a required number of two kind of conductor segments (small segments 332 and large segments 331) are prepared. Here, their legs adjacent with each other are extended linearly and their head portions are sharply bent) are prepared. The segment pairs are arranged along the circumferential direction in order to simultaneously insert them into the slots of the stator core.

Figure 5:
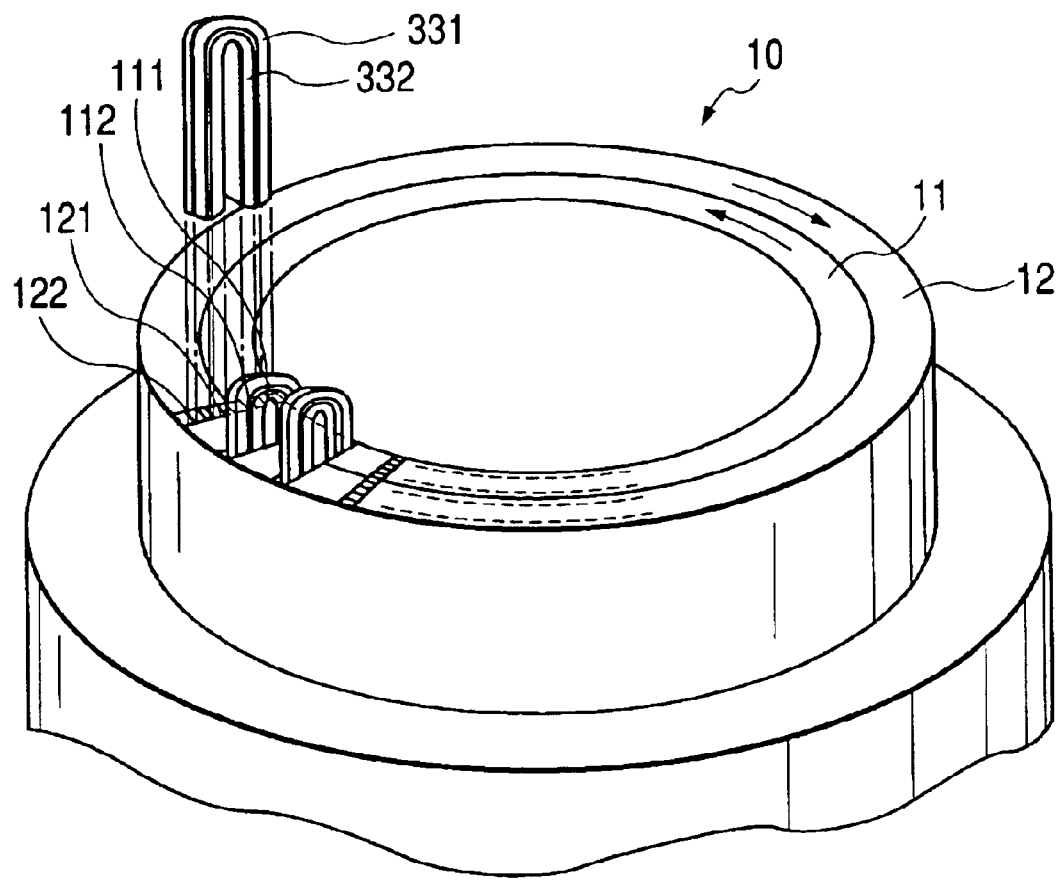
FIG. 5 schematically shows the segments which are being inserted into the larger and smaller rings of the segment bending apparatus.

As shown in FIG. 5, the bending apparatus 10 comprises a small ring 11 and a large ring 12. They are disposed co-axially and are relatively rotatable. There are provided in the large ring 12 pairs of holes 121 and 122 arranged along the radial direction and separated at a prescribed pitch along the circumferential direction. Similarly, there are provided in the small ring 11 pairs of holes 111 and 112. Here, the holes 111& 112 and 121 & 122 are arranged in a row along the radial direction, respectively. Then, a slot conductor portion (the right leg) of the large segment 331 is inserted into the innermost hole 111, while the other slot conductor portion (left leg) is inserted into the outermost hole 122. Further, a slot conductor portion (the right leg) of the small segment 332 is inserted into the second innermost hole 112, while the other slot conductor portion (the left leg) is inserted into the second outermost hole.

Figure 6:
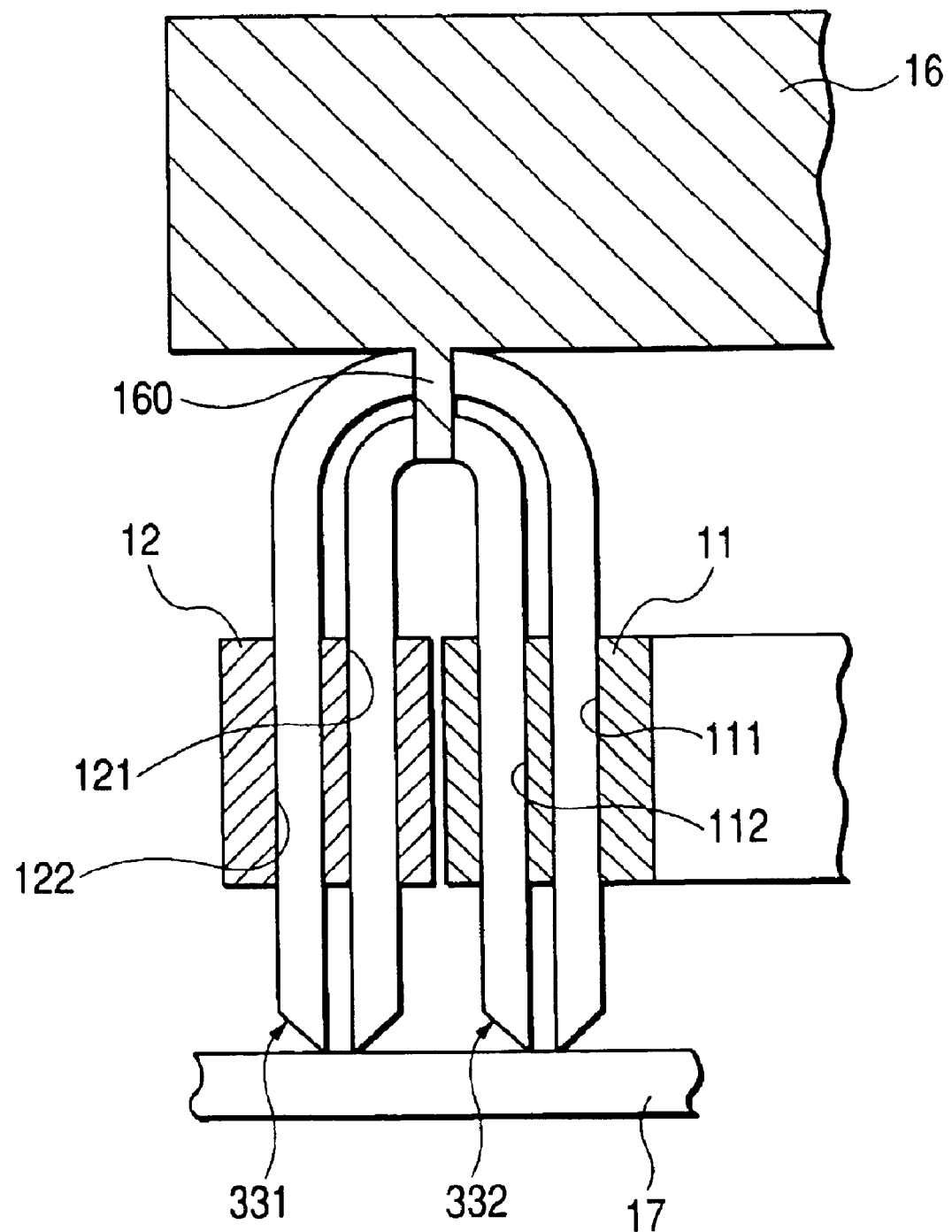
FIG. 6 is a schematic vertical cross sectional view of a fundamental apparatus for bending the head of the conductor segment.

As shown in FIG. 6, all the large and small segments 331 and 332 are inserted into the holes 111 & 122, 112 &121 of the large and small ring s 11 and 12. A plate 16 for pushing the head portions is disposed over the large and small rings 12 and 13. Further, the plate 16 is provided with a nail 160 which holds the head portions of the segment sets from both sides along the circumferential directions. Concretely, after inserting all the segment sets, the plate 16 descends in order to holds the head portions.

Then, the large ring 12 is rotated in a direction reverse to the small ring by a half magnet pole pitch, thereby extending their the head portions by a magnet pitch along the circumferential direction.

During rotating the rings 11 and 12, the head portions are fallen down along the axial direction of the rings. Accordingly, the plate 16 is also fallen down. On the other hand, plate 17 supports upwardly the segments 331 and 332. The plate 17 may be divided into an outer and inner plates which are fixed and rotated together with the large and small rings, respectively.

Then, during holding the segment sets by the nail 160 of the plate 16, the large and small ring s 12 and 11, respectively, are separated from the segment set.

End Portion Inserting

After pulling out the segments 331 and 332 from the rings 11 and 12, the small segment 332 is inserted into the second innermost position and second outermost position of a pair of the slots 35, while the large segment 331 is inserted into the innermost position and outermost position of the pair of the slots 35, as shown in FIG. 4. During the insertion processes, the head portion of the segments 331 and 332 are held together by the plate 16, thereby inserting all the segments simultaneously into the slots. After completing the segment insertion, the plate 16 is separated from the segments.

However, modified or other methods and apparatuses for inserting the segment pairs into the slots may be employed.

End Portion Bending

The end portion 331g of the outermost slot conductor portion 331b of the large segment 331 is bent toward a direction along the circumferential direction, while the end portion 331f of the innermost slot conductor portion 331a of the large segment 331 is bent toward the opposite direction along the circumferential direction. Further, as shown in FIG. 4, the end portion 332f of the second outermost slot conductor portion 332a of the small segment 332 is bent toward the above-mentioned opposite direction along the circumferential direction, while the end portion 332g of the second innermost slot conductor portion 332b of the small segment 332 is bent toward the direction opposite to the above-mentioned opposite direction along the circumferential direction. The slot conductor portions 331f and 331g are bent and separated relatively by a magnet pole pitch from the slot conductors 332f and 332g, respectively.

Figure 7:
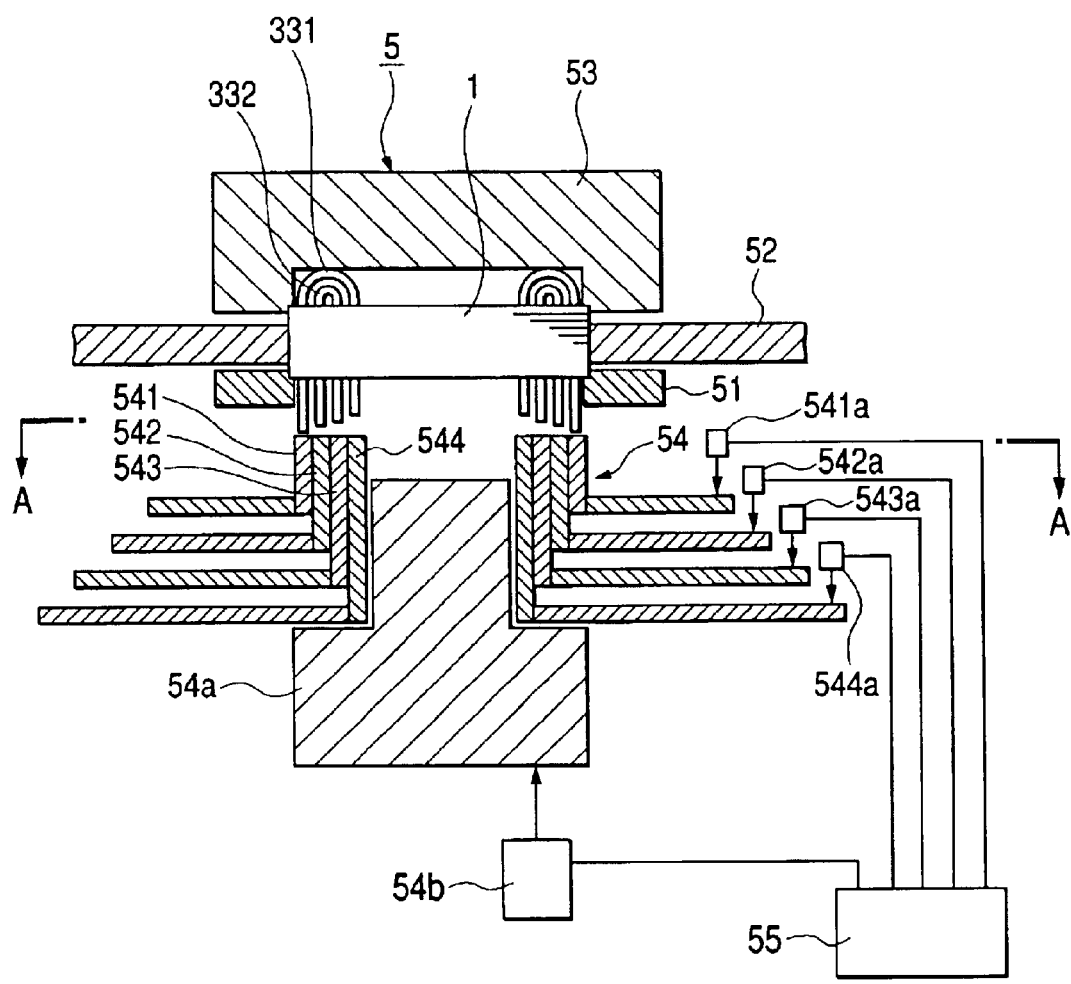
FIG. 7 is a schematic vertical cross sectional view of a fundamental apparatus for bending the legof the conductor segment.
Figure 8:
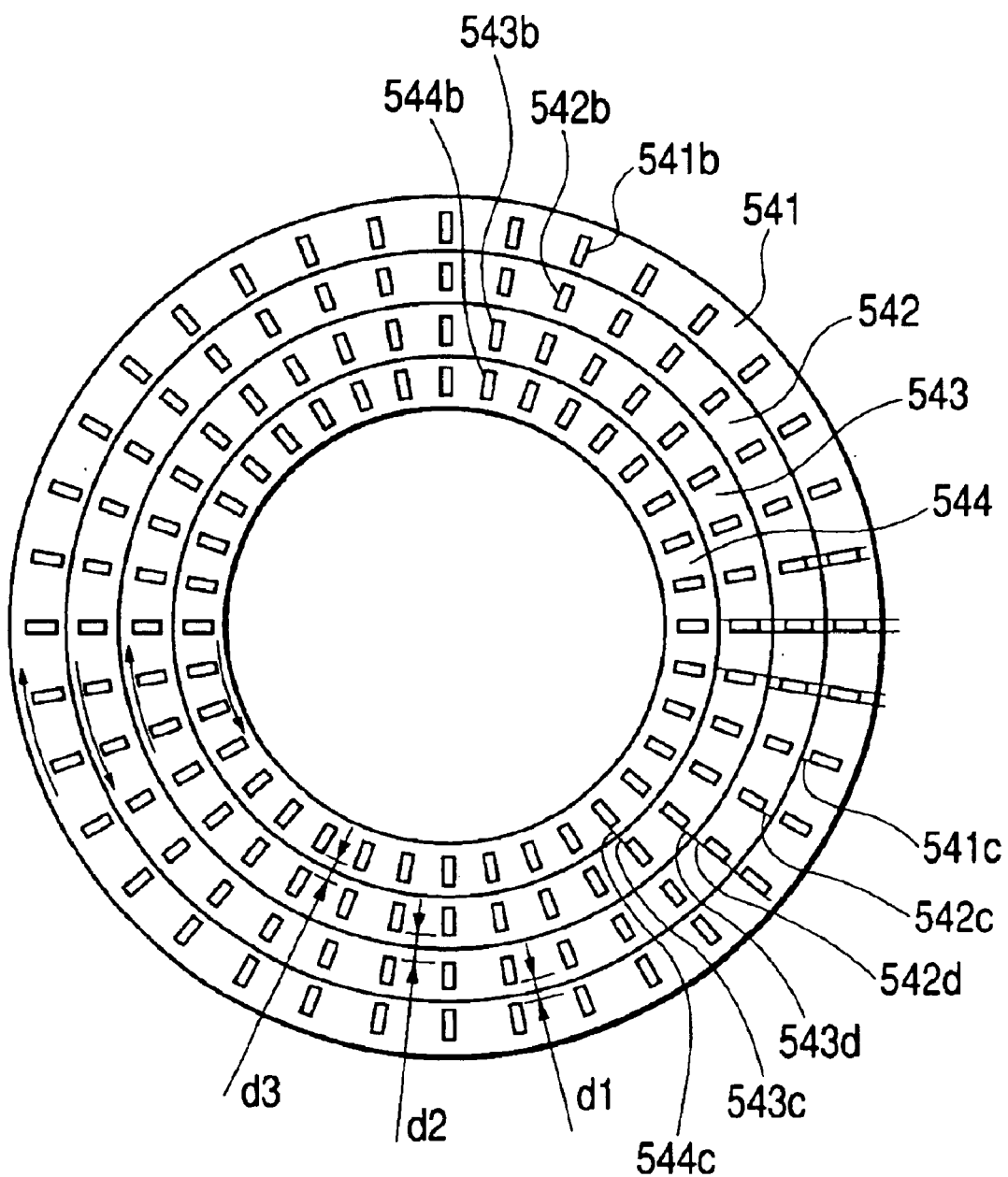
FIG. 8 is a plan view of the larger and smaller rings.

The end portion bending process is explained in further details, referring to FIGS. 7 and 8. FIG. 7 is a schematic longitudinal vertical cross sectional view of the stator coil bending apparatus. FIG. 8 is a sectional view along line A—A.

The stator coil bending apparatus 500 comprises: a work receiver 51 for receiving the outer circumference of the stator core 1; a clumper 52 for prohibiting a radial motion of the stator core 1; a work weight 53 for preventing the stator core 1 from floating up; a bending bed 54 for bending the projected leg portions which are projected from the stator core 1, a shaft 54a for moving up and down axially the bending bed 54; rotating mechanisms 541a through 544a for rotating along the circumferential direction the bending bed 54; a shaft driving mechanism 54b for moving up and down the shaft 54a; and a controller 55 for controlling the rotating mechanisms 541a through 544a and shaft driving mechanism 54b.

There are in bending bed 54 cylindrical bending jigs 541 through 544 (of which end surfaces are disposed on a surface) which are disposed co-axially, are rotatable independently by the rotating mechanisms 541a through 544a, respectively and are further moved up and down by moving the shaft 54a by using the shaft driving mechanism 54b.

As shown in FIG. 8, There are formed on the end surfaces of the cylindrical bending bed jigs 541 through 544 segment inserting portions 541b through 544b for holding the tips of the end portions 331f, 331g, 332f and 332g. The total slot number is equal to the number of the segment inserting portions 541b through 544b formed along the circumferential direction of the bending jigs 541 through 544.

As shown in FIG. 8, there are provided walls 541c through 544c, 542d and 543d for preventing mutual connection of the segment inserting portions 541b through 5444b. The distance d2 between the walls 542d and 543d are made greater than the distances d1 and d3, where d1 is the distance between the walls 541c and 542c, and d3 is the distance between the walls 543c and 544c.

Next, the operation of the stator coil bending apparatus is explained.

The stator core 1 of which slots 35 receive the segment sets 33 is received by the work receiver 51 and then, the outer circumference of the stator core 1 is fixed at the clumper 52. Then, the work weight 53 presses the upper portion of the stator core 1 and head portions 331c of the large segments 331, thereby preventing the stator core 1 and segment sets 33 from moving up and down.

After fixing the stator core 1 having segment sets 33 by using the clumper 52 and work receiver 51, the bending bed 54 is elevated by using the shaft 54a, thereby inserting the end portions 331f, 331g, 332f and 332g into the segment inserting portions 541b through 544b.

The tips of the end portions 331f, 331g, 332f and 33g which are portions joining the segments with each other) are tapered. Accordingly, only the tips are allowed to be easily received into the segment inserting portions 541b through 544b.

After inserting the tips of the segment end portions, the bending bed 54 is rotated and moved up and down.

Next, the rotation of the bending bed 54 is explained.

The bending jigs 541 and 543 are rotated clockwise by a first angle, while the bending jigs 542 and 544 are rotated counterclockwise by a second angle. Here, the first angle may not be equal, as far as a sum of the first and second angles becomes a required slot pitch.

Then, the bending bed 54 is elevated and elevated by the shaft driving mechanism 54b and rotating mechanisms 541a through 544a, in such a manner that the lengths of the end portions 331f, 331g, 332f and 332g from the exit of the slots 35 to the entrance of the segment inserting portions 541b through 544b. Here, it is preferable that the end portions 331f, 331g, 332f and 332g are rotated and elevated along arc trajectories to a prescribed angle over the angle corresponding to a half magnet pole pitch. Thus, the deformations due to a spring-back effect of the segment sets 33 are prevented.

Then, the shaft driving mechanism 54b and rotating mechanisms 541a through 544a are rotated along the reverse direction and fallen down, thereby removing the end portions 331f, 331g, 332f and 332g from the segment inserting portions 541b through 544b. Further, the bending bed 54 returns back to the original position by the rotating mechanisms 541a through 544a. Finally, the clumper 52 and work receiver 53 are removed and the stator 1 is taken out.

Summarizing the bending process, the end portions of the segment 33 are rotated, displaced and brought down along the circumferential direction. Then, the end portions are displaced along the circumferential and axial directions and are then, deeply brought down. Then, the end portions are displaced along the circumferential and axial directions and are then, excessively deeply brought down. Then, the end portions are brought back at a prescribed positions.

The bending bed 54 moves not only along the circumferential direction but also along the axial direction. Accordingly, the end portions 331f, 331g, 332f and 332g can be bent along arc trajectories in such a manner that the lengths of the end portions 331f, 331g, 332f and 332g from the exits of the slots 35 to the entrance of the inserting portions 541b through 544b (e.g., the lengths of the end portions 331f, 331g, 332f and 332g subtracted by the length of the tips 331d, 331e, 332d and 332e) are kept constant. Accordingly, the segments 33 can not escape from the segment inserting portions 541b through 544b.

Further, only the tips 331d, 331e, 332d and 332e of the segment 33 are inserted in the segment inserting portions 541b through 544b. Accordingly, the segments 33 can not escape from the segment inserting portions 541b through 544b.

Segment Welding

After the segment bending process, the tip 331d is welded to the tip 332d', and the tip 332d is welded to the tip 331d', by, e.g., arc welding, as shown in FIGS. 1 and 2. Similarly, the tips 332e and 331e are arc-welded to the tips 331e' and 332e' (not-shown), and so forth, thereby finishing the stator coil 3.

Improved Head Portion Bending Process

Figure 10:
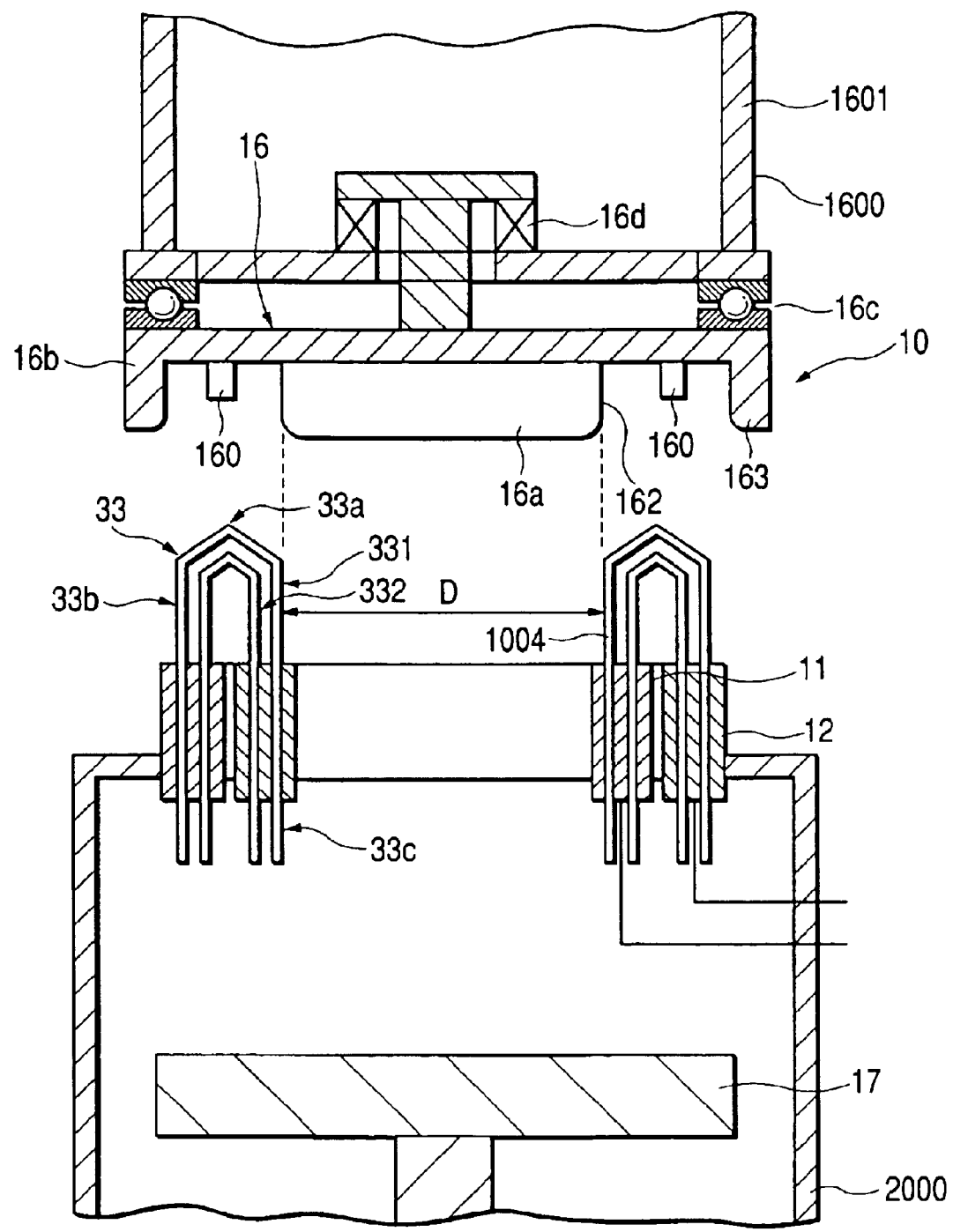
FIG. 10 is a schematic vertical cross sectional view of a modified apparatus for bending the heads of the conductor segments.

The present invention is characterized by the improved head portion bending process. The head portion bending process is explained. The head portion bending apparatus 10 as shown in FIG. 10 is fundamentally similar to that as shown in FIG. 6. However, some elements with the similar reference numerals used in the above-explained embodiment may possibly be irrelevant with each other in a technical point of view. The main difference is that the pushing plate 16 has a disc guide member 16a as shown in FIG. 10.

As shown in FIG. 10, the head portion pressing member 1600 is disposed co-axially with the segment rotating unit 2000 having the rings 11 and 12. The elevating cylinder 1601 moved up and down by a not-shown cylinder holds rotatably to the thrust bearings 16c and 16d under the lower surface of the elevating cylinder 1601. The thrust bearing 16c sustains the weight of the pushing plate 16, while the thrust bearing 16d allows the pushing plate 15 to rotate.

The nail 160 of the pushing plate 16 is positioned right above the head tip 33a of the segment set 33. Further, the disc guide member 0.16a is provided at the lower surface of the pushing plate 16. The outer diameter of the disc guide member 16a is made slightly greater than the distance D between the larger segment 331 of the segment set 33. Further, the corner between the lower surface and outer circumference 162 of the disc guide plate 16a is beveled.

A cylindrical member 163 prevents the head portion of the segments 33 from projecting toward the outer radius direction, when the segments 33 are bent and expanded.

The leg portion 33c of the segment 33 projects downward from the rings 11 and 12 and contacts the regulating plate 17. The linear portion 33b projecting upward from the rings 11 and 12 is bent by the bending apparatus 10 and becomes the head oblique portion.

Moving down the head pushing member 1600, moving up the regulating plate 17, holding the tip of the head portion 33a by using the nail 160 and securing a prescribed length of the linear portion 33b, the rings 11 and 12 are rotated to the opposite directions with each other by a half magnet pole pitch, thereby bending the linear portion 33b along the circumferential direction. Thus, the linear portion 33b is deformed to the head oblique portion.

Although the axial length of the linear portion 33b is reduced during the bending process, the nail 160 does not fail to hold the tip of the head portion 33a due to the pushing plate 16 pushing down the tip of the head portion 33a.

The linear portions 33b of the larger segments 331 at the inner radius side are bent along the circumerential direction and along the outer circumferential surface of the disc guide member 16a.

However, a similar guide member may alternatively be provided at the inner surface of the ring 11.

Improved Leg Tip Bending Process

The present invention is also characterized by the improved leg tip bending process. The process for bending the tip of the leg portion is explained. However, the similar reference numerals used in the above explanations may possibly be irrelevant with each other in a technical point of view.

Figure 11:
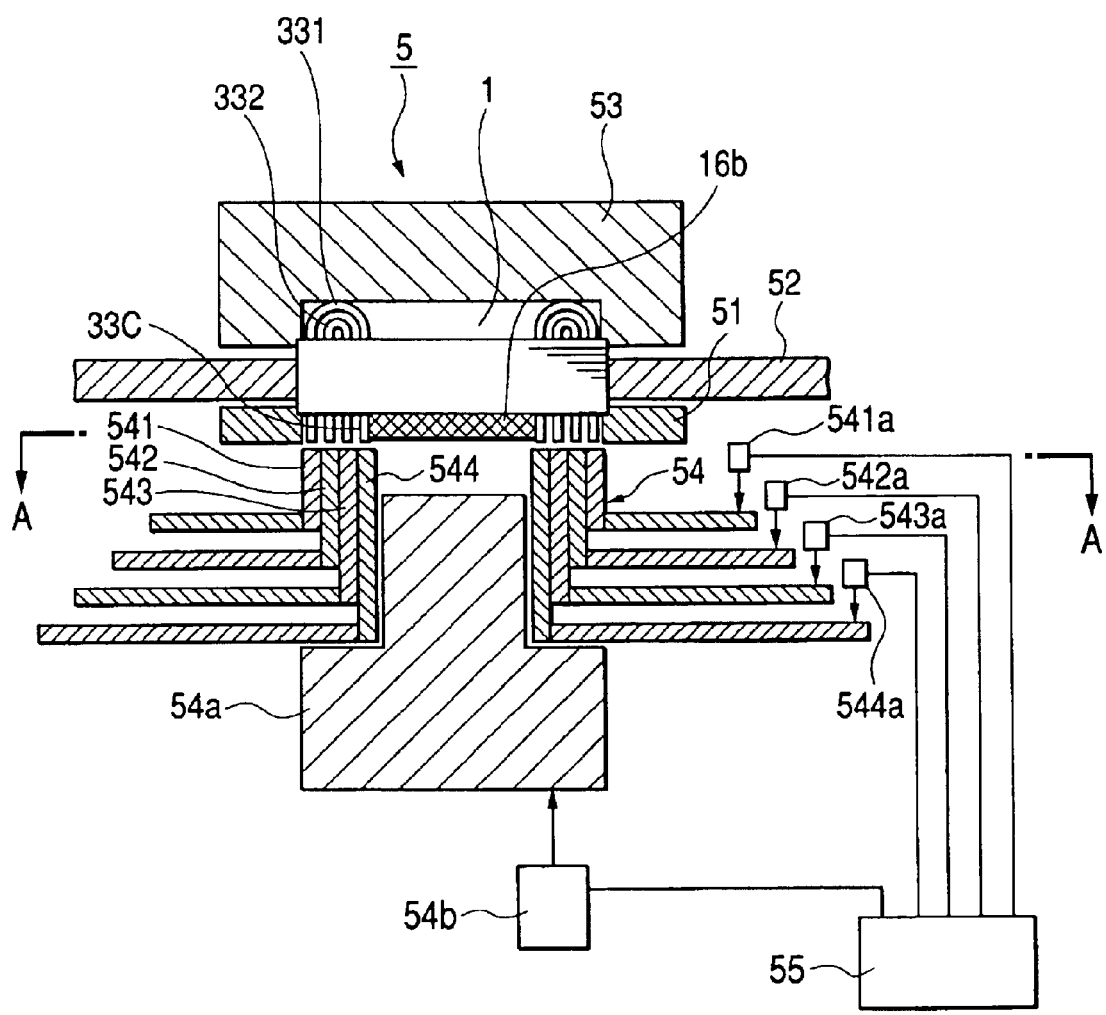
FIG. 11 is a schematic vertical cross sectional view of a modified apparatus for bending the legs of the conductor segments.

The tip bending apparatus as shown in FIG. 11 for the leg tip bending process is fundamentally similar to that as shown in FIG. 7. The differences are that a disc guide member 16b is added and that.

The disc guide member 16b (for example, may have a permanent magneto built-in) is fixed at the lower surface of the stator core 1. Further, the outer circumferential surface of the disc guide member 16b almost contacts the inner circumferential surface of the larger segment 331.

When the tip of the leg portions 33c are disposed on the bending jig 543 and are bent, the outer circumferential surface of the disc guide member 16b prevents the leg portions 33c of the larger segments 331 from inclining toward the inner radius direction, thereby bending and extending the linear portions 33c along the circumferential direction.

Figure 12:
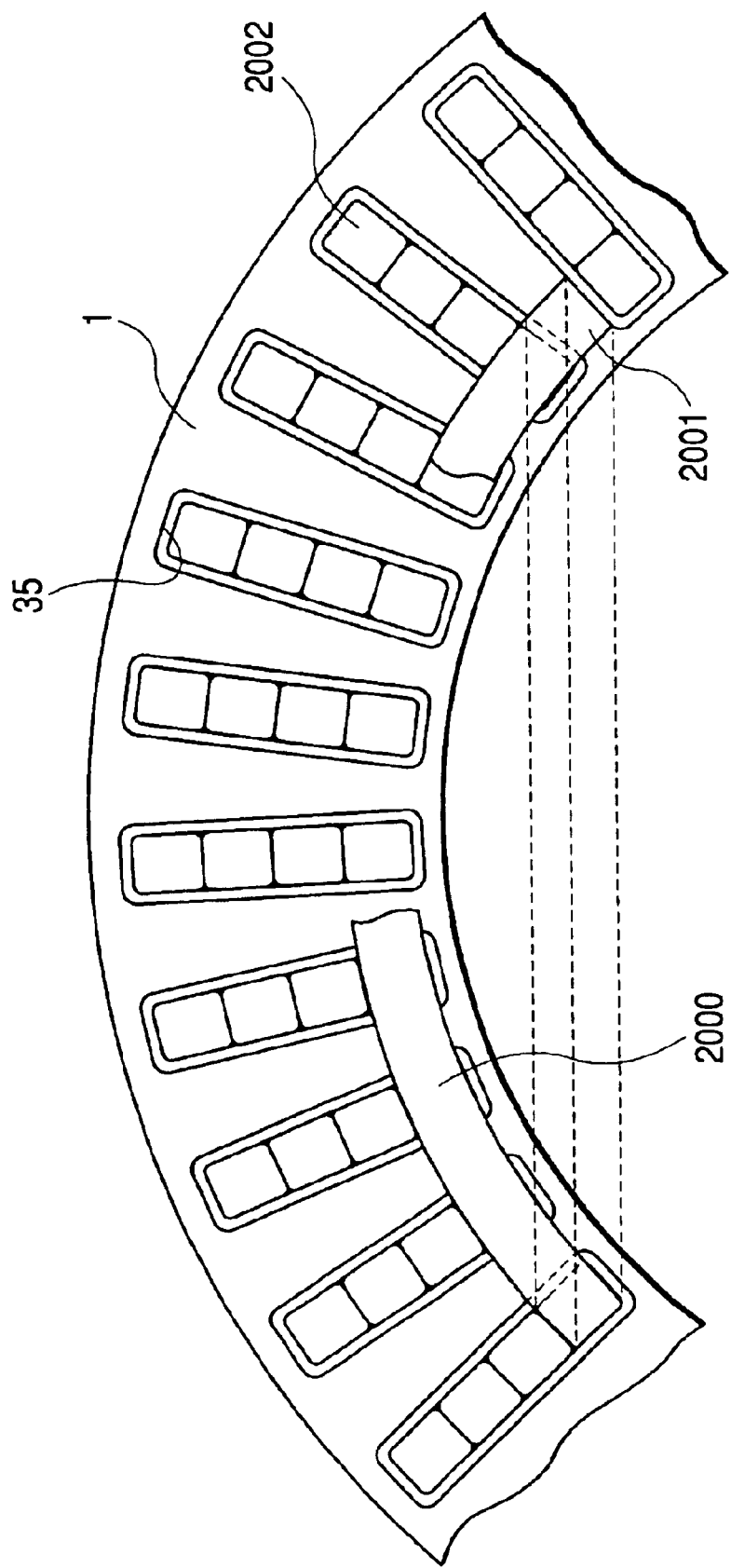
FIG. 12 is a partial bottom vies of the stator core which receives a plurality of the conductor segments, one of which being bent along the circumferential direction by the leg bending apparatus as shown in FIG. 11.
Figure 13:
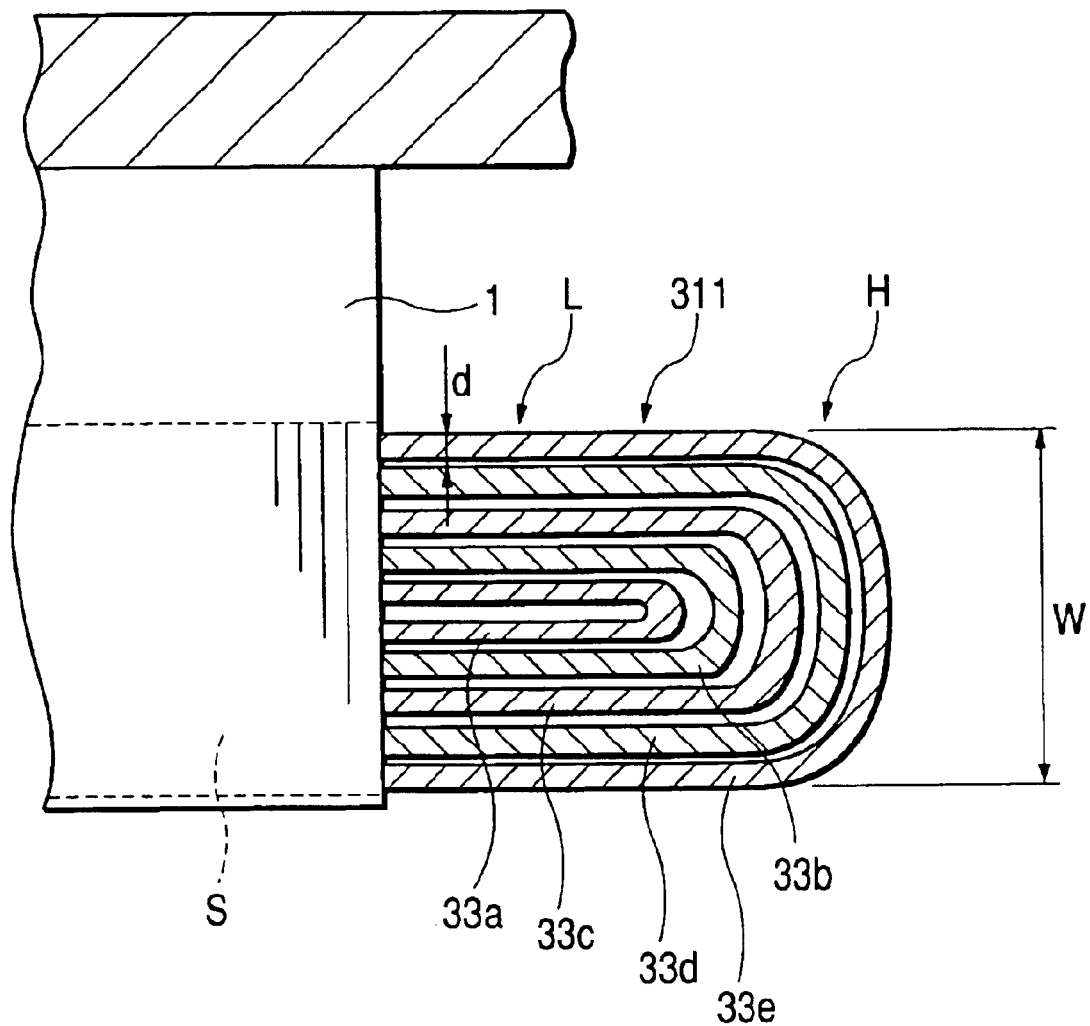
FIG. 13 is a side view of a conventional segment set before bending.

FIG. 12 shows the end oblique portions 2000 extending along the circumferential direction. There are received in the each slot 35 four conductor segments 2002 along the radial direction. A tip 2001 is an end tip of the end oblique portion of 2000 and projects toward the axial direction. The dotted line shows an end oblique portion, if the disc guide members 16a and 16b would not have been used.

The disc guide member 16b or its equivalents may alternatively be disposed on the elevating shaft 54a or the bending jig 544.

What is claimed is:

1. A stator coil, comprising:
   a plurality of segments received in a plurality of slots of a stator core and serially connected with each other to construct one turn in a phase coil in M (integer greater than or equal to 3) phase coils, said slots being arranged along a circumferential direction of said stator core, and each slot having an even number of receiving positions disposed along a radial direction of said stator core;
   each of said segments comprising: a pair of slot conductor portions which are, respectively, received in two receiving positions of a pair of slots distant by a prescribed pitch in said circumferential direction of said stator core; a head portion which is projected toward an end of said stator core; and a pair of projected end portions each of which is projected from another end of said stator core;
   said head portion comprising: a U-shaped head tip portion; and a pair of head oblique portions each of which is stretched obliquely along the circumferential and axial directions of said stator core;
   said pair of projected end portions comprising: a pair of end oblique portions each of which stretches obliquely along the circumferential and axial directions of said stator core; and a pair of end tip portions each of which is formed at a tip of said corresponding end oblique portion and is joined with an end tip of said other end tip portion;
   wherein each of said head oblique portions or each of said end oblique portions is made circular-arch-shaped around an axis of said stator core.

2. The stator coil, according to claim 1, wherein:
   each of said slots receives at different receiving positions a plurality of segment sets and a larger segment surrounds a smaller segment which is received at adjacent receiving positions;
   a group of said segment sets received at the same radial positions and disposed along the circumferential direction forms a group of partial phase coils to which the same phase voltage is applied; and
   said partial phase coils received at said adjacent receiving positions in a slot are sequentially connected in series, thereby forming said phase coil.

3. The stator coil according to claim 2, wherein:
   a group of slots along the circumferential direction receiving said segments to which the same phase voltage is applied is made a same phase slot group;
   a plurality of series phase coil circuit made of said partial phase coils sequentially connected in series are formed in different slots in said same phase slot group; and
   said series phase coil circuits are connected in parallel, thereby forming said phase coil.

4. A stator coil, comprising:
   a plurality of segments received in a plurality of slots of a stator core and serially connected with each other to construct a phase coil in M (integer greater than or equal to 3) phase coils, the slots being arranged along a circumferential direction of the stator core, each slot penetrating through the stator coil in an axial direction of the stator coil between an inner circumferential surface and an outer circumferential surface of the stator core, and each slot having an even number of receiving positions disposed along a radial direction of the stator core;
   each of the segments comprising: a pair of slot conductor portions which are, respectively, received in two receiving positions of a pair of slots distant by a predetermined pitch in the circumferential direction of the stator core; a head portion which is projected toward an end of the stator core in the radial direction of the stator core; and a pair of projected end portions each of which is projected from another end of the stator core;
   the head portion comprising: a U-shaped head tip portion; and a pair of head oblique portions each of which is stretched obliquely along the circumferential and axial directions of the stator core;
   the pair of projected end portions comprising: a pair of end oblique portions each of which stretches obliquely along the circumferential and axial directions of the stator core; and a pair of end tip portions each of which is formed at a tip of the corresponding end oblique portion and is joined with an end tip of the other end tip portion;
   wherein each of the head oblique portions or each of the end oblique portions is bent in the radial direction of the stator core in a bow shape not to go beyond the inner circumferential surface of the stator core.

5. The stator coil according to claim 4, wherein the segments are composed of a plurality of segment sets disposed along the circumferential direction, each segment set is composed of a larger segment and a smaller segment, the two receiving positions of the pair of slot conductor portions of each smaller segment are adjacent to each other in the radial direction and are disposed in two slots distant by the predetermined pitch in the circumferential direction, each larger segment is received in the same slots as those of the corresponding smaller segment so as to surround the smaller segment in the radial direction, the segment sets connected with each other forms a partial phase coil to which a partial phase voltage is applied, another partial phase coil or each of other partial phase coils to which the same partial phase voltage is applied is formed by other segments received in other receiving positions different from those of the segments in the radial direction, and each pair of partial phase coils adjacent to each other in the radial direction are connected with each other to form the phase coil from the partial phase coils serially connected with each other.

6. The stator coil according of claim 5, wherein the segments of the partial phase coils serially connected with each other are received in a plurality of receiving positions of a same phase slot group which is composed of the slots disposed at equal intervals of the predetermined pitch in the circumferential direction, a serial phase coil circuit is made of the partial phase coils serially connected with each other, another serial phase coil circuit or each of other serial phase coil circuits is made of other serially-connected partial phase coils of which segments are received in a plurality of receiving positions of another same phase slot group which is composed of a plurality of other slots disposed at equal intervals of the predetermined pitch in the circumferential direction, and all of the serial phase coil circuits are connected in parallel, thereby forming the phase coil.

* * * * *